(12) United States Patent
Schoenfelder et al.

(10) Patent No.: US 8,722,796 B2
(45) Date of Patent: May 13, 2014

(54) PROCESS FOR PREPARING AN AQUEOUS POLYMER DISPERSION

(75) Inventors: Daniel Schoenfelder, Brussels (BE);
Rabie Al-Hellani, Ludwigshafen (DE);
Marc Schroeder, Canton, MI (US);
Monika Haberecht, Ludwigshafen (DE); Anna Cristadoro, Heppenheim (DE); Bernd Bruchmann, Freinsheim (DE); Rajan Venkatesh, Mumbai (IN)

(73) Assignee: BASF SE, Ludwigshafen (DE)

( * ) Notice: Subject to any disclaimer, the term of this patent is extended or adjusted under 35 U.S.C. 154(b) by 445 days.

(21) Appl. No.: 13/006,819

(22) Filed: Jan. 14, 2011

(65) Prior Publication Data

US 2011/0178241 A1   Jul. 21, 2011

Related U.S. Application Data

(60) Provisional application No. 61/296,500, filed on Jan. 20, 2010.

(51) Int. Cl.
  *C08L 33/02* (2006.01)
  *B82Y 30/00* (2011.01)
  *B82Y 40/00* (2011.01)

(52) U.S. Cl.
  CPC ... *B82Y 30/00* (2013.01); *B82Y 40/00* (2013.01)
  USPC ............ 524/853; 524/460; 524/845; 524/854

(58) Field of Classification Search
  CPC ............................... B82Y 30/00; B82Y 40/00
  USPC ................... 524/460, 845, 853, 854
  See application file for complete search history.

(56) References Cited

U.S. PATENT DOCUMENTS

| | | | |
|---|---|---|---|
| 7,109,247 B2 | 9/2006 | Baran, Jr. et al. | |
| 8,309,646 B2 * | 11/2012 | Terrenoire et al. | 524/502 |
| 2006/0106172 A1 * | 5/2006 | Karlsson | 525/242 |
| 2006/0287425 A1 * | 12/2006 | Karlsson et al. | 524/457 |
| 2007/0202071 A1 | 8/2007 | Morvan et al. | |
| 2007/0274942 A1 * | 11/2007 | Morvan et al. | 424/70.19 |
| 2010/0055446 A1 * | 3/2010 | Seyffer et al. | 428/327 |
| 2010/0280165 A1 * | 11/2010 | Terrenoire et al. | 524/502 |
| 2010/0324261 A1 | 12/2010 | Muelhaupt et al. | |
| 2011/0015301 A1 | 1/2011 | Herth et al. | |
| 2011/0178241 A1 * | 7/2011 | Schonfelder et al. | 524/822 |
| 2011/0201745 A1 * | 8/2011 | Roller et al. | 524/502 |

FOREIGN PATENT DOCUMENTS

| | | | |
|---|---|---|---|
| DE | 196 24 299 A1 | 1/1997 | |
| DE | 196 21 027 A1 | 11/1997 | |
| DE | 197 41 184 A1 | 3/1999 | |
| DE | 197 41 187 A1 | 3/1999 | |
| DE | 198 05 122 A1 | 4/1999 | |
| DE | 198 28 183 A1 | 12/1999 | |
| DE | 198 39 199 A1 | 3/2000 | |
| DE | 198 40 586 A1 | 3/2000 | |
| DE | 198 47 115 C1 | 5/2000 | |
| DE | 199 47 631 A1 | 6/2000 | |
| DE | 199 04 444 A1 | 8/2000 | |
| DE | 101 63 163 A1 | 7/2003 | |
| DE | 102 11 664 A1 | 10/2003 | |
| DE | 102 19 508 A1 | 11/2003 | |
| DE | 102 40 817 A1 | 3/2004 | |
| EP | 0 771 328 B1 | 10/1998 | |
| EP | 1 036 106 B1 | 8/2003 | |
| EP | 2093266 * | 8/2008 | |
| WO | WO 97/02304 A1 | 1/1997 | |
| WO | WO 99/16810 A1 | 4/1999 | |
| WO | WO 00/56802 A1 | 9/2000 | |
| WO | WO 01/46296 A1 | 6/2001 | |
| WO | WO 03/062306 A1 | 7/2003 | |
| WO | WO 03/066702 A1 | 8/2003 | |
| WO | WO 2004/072125 A1 | 8/2004 | |
| WO | WO 2004/101624 A2 | 11/2004 | |
| WO | WO 2005/007726 A1 | 1/2005 | |
| WO | WO 2005/026234 A1 | 3/2005 | |
| WO | WO 2005/044897 A1 | 5/2005 | |
| WO | WO 2005/075541 A1 | 8/2005 | |
| WO | WO 2006/018125 A1 | 2/2006 | |
| WO | WO 2006/087227 A2 | 8/2006 | |
| WO | WO 2006/089940 A1 | 8/2006 | |
| WO | WO 2009065867 A1 * | 5/2009 | ............. C08L 33/04 |
| WO | WO 2009/101141 | 8/2009 | |
| WO | WO 2009/109622 A1 | 9/2009 | |
| WO | WO 2010/130599 A1 | 11/2010 | |

OTHER PUBLICATIONS

Boltorn H20 Data Sheet. No Author, No Date. Obtained from http://www.perstorppolyols.com/upload/pds_h20.pdf on Dec. 13, 2012.*
"Kolloid-Zeitschrift & Zeitschrift für Polymere", vol. 190, p. 1, equation 1, Jul./Aug. 1963, 17 pages.
T.G. Fox, Bull. Am. Phys. Soc. 1956,(Ser. II), p. 123.
"Ullmanns Encyklopädie der Technischen Chemie" vol. 19, p. 18, 4th edition, Verlag Chemie, 1980, 4 pages.
"Ullmanns Encyclopedia of Industrial Chemistry", 5th edition, vol. A21, Verlag Chemie, 1992, p. 169.

(Continued)

*Primary Examiner* — Michael Pepitone
*Assistant Examiner* — Michael A Salvitti
(74) *Attorney, Agent, or Firm* — Oblon, Spivak, McClelland, Maier & Neustadt, L.L.P.

(57) ABSTRACT

Process for preparing an aqueous polymer dispersion with small polymer particles.

18 Claims, No Drawings

(56) References Cited

OTHER PUBLICATIONS

Houben-Weyl, Methoden der Organischen Chemie, vol. XIV/1, Makromolekulare Stoffe, Georg-Thieme-Verlag, 1961, pp. 411 to 420.

Houben-Weyl, Methoden der Organischen Chemie, vol. XIV/1, Makromolekulare Stoffe, Georg-Thieme-Verlag, 1961, pp. 192-208.

Paul J. Flory, "Molecular Size Distribution in Three Dimensional Polymers. VI. Branched Polymers Containing A-R-$B_{f-1}$ Type Units", J. Am. Chem. Soc. 1952, 74, pp. 2718 to 2723.

Alexander Sunder et al., "Controlling the Growth of Polymer Trees: Concepts and Perspectives for Hyperbranched Polymers", Chem. Eur. J. 2000, 6, No. 14, pp. 2499 to 2506.

C. Gao, et al., "Hyperbranched Polymers: from Synthesis to Applications", Progress in Polymer Science, 29 (2004), pp. 183 to 275.

S.E. Harding et al., Analytical Ultracentrifugation in Biochemistry and Polymer Science, Royal Society of Chemistry, 1992, Chapter 10, pp. 147 to 175.

U.S. Appl. No. 13/028,624, filed Feb. 16, 2011, Roller, et al.

U.S. Appl. No. 13/440,463, filed Apr. 5, 2012, Henningsen, et al.

U.S. Appl. No. 13/319,465, filed Nov. 8, 2011, Tuerk, et al.

\* cited by examiner

PROCESS FOR PREPARING AN AQUEOUS POLYMER DISPERSION

The present invention relates to a process for preparing an aqueous dispersion of polymer particles having a number-average particle diameter ≤100 nm by free-radically initiated polymerization of at least one ethylenically unsaturated monomer M in the presence of at least one free-radical initiator and at least one highly branched polymer in an aqueous polymerization medium, the polymerization being carried out using ≤1% by weight of at least one dispersing assistant and ≥5% and ≤60% by weight of the at least one highly branched polymer, based on the total amount of the at least one ethylenically unsaturated monomer M (total monomer amount), and the at least one highly branched polymer containing ≥0.3 mmol of acid groups per gram of highly branched polymer, which process comprises introducing in the aqueous polymerization medium initially only ≥10% by weight of the total amount of the at least one highly branched polymer and optionally
≤50% by weight of the total amount of the at least one ethylenically unsaturated monomer M and subsequently, under polymerization conditions, adding any remainder of the at least one highly branched polymer, and adding the total amount or any remainder of the at least one ethylenically unsaturated monomer M, and carrying out polymerization to a monomer conversion ≥80% by weight.

Likewise provided by this invention are the aqueous polymer dispersions obtainable by the process of the invention, the polymer powders obtainable from said dispersions, and the use of the aqueous polymer dispersions or of the polymer powders.

The preparation of aqueous polymer dispersions using highly branched polymers is based on the prior art as set out below.

WO 2004/072125, accordingly, discloses the preparation of aqueous ethylene/vinyl ester copolymer dispersions under pressure, where small amounts of dendritic polymers are added as well as a large amount of dispersing assistant to the aqueous phase. Preferred dendritic polymers contain at least 6 hydroxyl groups.

U.S. Pat. No. 7,109,247 discloses aqueous dispersions of organic or inorganic particulate solids, with branched or hyperbranched polyethylene oxides being used to disperse these solids in aqueous phase.

US-A 2007/202071 discloses very generally dendritic polymers composed of hydrophobic and hydrophilic structural elements as dispersing assistants in aqueous systems. Among a large number of applications, there is a general indication that dendritic polymers composed of hydrophobic and hydrophilic structural elements can also be used as dispersing assistants for aqueous emulsion polymerization.

Against this background of the prior art, the object of the present invention was a specific process for preparing aqueous polymer dispersions whose polymer particles have an average particle diameter ≤100 nm.

This object has been achieved through the provision of the process defined at the outset.

The aqueous dispersion of polymer particles having a number-average particle diameter ≤100 nm (polymer dispersion) is prepared using clear water, preferably deionized water, whose total amount is such that it is 30% to 95% by weight and advantageously 50% to 85% by weight, based in each case on the aqueous polymer dispersion. In this context, in accordance with the invention, at least some of the water is introduced in the form of an aqueous polymerization medium in a polymerization vessel. Any remaining water may then be supplied to the polymerization medium under polymerization conditions, discontinuously in one or more portions, or continuously with flow rates which change or which remain the same. Any remainders of water are advantageously metered into the aqueous polymerization medium under polymerization conditions together with the ethylenically unsaturated monomers M and/or the free-radical initiators, and preferably the remainders of water are metered in together with the free-radical initiators.

As ethylenically unsaturated monomers M it is possible in accordance with the invention to use all those ethylenically unsaturated monomers which are typically employed in free-radically initiated aqueous emulsion polymerization, which is familiar to the skilled worker. Monomers M contemplated include all those ethylenically unsaturated monomers M which at 20° C. and 1 atm (absolute) have a solubility <100 g, preferably <60 g, and with particular preference <20 g per 1000 g of deionized water, such as, for example, olefins, such as ethylene or propylene, vinylaromatic monomers, such as styrene, α-methylstyrene, o-chlorostyrene or vinyltoluene, vinyl halides, such as vinyl chloride or vinylidene chloride, esters of vinyl alcohol and monocarboxylic acids having 1 to 18 C atoms, such as vinyl acetate, vinyl propionate, vinyl n-butyrate, vinyl laurate, and vinyl stearate, esters of α,β-monoethylenically unsaturated monocarboxylic and dicarboxylic acids having preferably 3 to 6 C atoms, such as, more particularly, acrylic acid, methacrylic acid, maleic acid, fumaric acid, and itaconic acid, with alkanols having generally 1 to 12, preferably 1 to 8, and more particularly 1 to 4 C atoms, such as, particularly, methyl, ethyl, n-butyl, isobutyl, pentyl, hexyl, heptyl, octyl, nonyl, decyl, and 2-ethylhexyl acrylate and methacrylate, dimethyl or di-n-butyl fumarate and maleate, nitriles of α,β-monoethylenically unsaturated carboxylic acids, such as acrylonitrile, methacrylonitrile, fumaronitrile, maleonitrile, and C4-8 conjugated dienes, such as 1,3-butadiene (butadiene) and isoprene. The stated monomers generally form the principal monomers, which, based on the total amount of monomers M, account for a fraction of ≥30%, frequently ≥50% and often ≥80% by weight.

Also contemplated as monomers M are all those ethylenically unsaturated monomers which at 20° C. and 1 atm (absolute) have a solubility ≥200 g, preferably ≥300 g, and more particularly preferably ≥500 g per 1000 g of deionized water. Monomers M which have this kind of high water solubility frequently carry at least one acid group, more particularly a carboxylic or sulfonic acid group, a hydroxyalkyl group, an amide group, an ethyleneurea group, an acetoacetoxy group, such as, for example, acrylic acid, methacrylic acid, 2-acrylamido-2-methylpropanesulfonic acid (AMPS), vinylsulfonic acid, acrylamide, methacrylamide, N-(2-methacryloyloxyethyl)ethyleneurea (UMA), N-(2-acryloyloxyethyl)ethyleneurea, 2-acetoacetoxyethyl acrylate, 2-acetoacetoxyethyl methacrylate (AAEM), diacetoneacrylamide (DAAM), 2-hydroxyethyl acrylate, hydroxypropyl acrylate, 2-hydroxyethyl methacrylate and hydroxypropyl methacrylate. Particularly preferred are acrylic acid, methacrylic acid, acrylamide and/or AMPS. It will be appreciated that, in accordance with the invention, the intention is to embrace as well the alkali metal salts or ammonium salts of the aforementioned monomers with one acid group, more particularly a carboxylic or sulfonic acid group. The amount of these water-soluble monomers M is generally ≤10%, advantageously ≥0.5% and ≤5%, and with particular advantage ≥1% and ≤3%, by weight, based in each case on the total amount of the monomers M.

Monomers M which typically increase the internal strength of the films of a polymer matrix normally have at least two nonconjugated ethylenically unsaturated double bonds. Examples of such are monomers containing two vinyl radicals, monomers containing two vinylidene radicals, and monomers containing two alkenyl radicals. Particularly advantageous in this context are the diesters of dihydric alcohols with α,β-monoethylenically unsaturated monocarboxylic acids, among which acrylic and methacrylic acid are preferred. Examples of monomers of this kind containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, cyclopentadienyl acrylate, triallyl cyanurate or triallyl isocyanurate. The amount of these so-called crosslinking monomers M is generally ≥0.01% and ≤60%, advantageously ≥0.5% and ≤50%, and with particular advantage ≥1% and ≤30%, by weight, based in each case on the total amount of the monomers M.

It will be appreciated that in accordance with the invention it is also possible to use mixtures of different monomers M.

Advantageously in accordance with the invention it is possible with advantage to use those mixtures of monomers M which contain 30% to 99.9% by weight of esters of acrylic and/or methacrylic acid with alkanols containing 1 to 12 C atoms and/or styrene, or 30% to 99.9% by weight of styrene and/or butadiene, or 30% to 99.9% by weight of vinyl chloride and/or vinylidene chloride, or 30% to 99.9% by weight of vinyl acetate, vinyl propionate, vinyl esters of versatic acid, vinyl esters of long-chain fatty acids and/or ethylene.

With particular advantage it is possible in accordance with the invention to use those mixtures of monomers M which contain 0.1% to 5% by weight of at least one α,β-monoethylenically unsaturated monocarboxylic and/or dicarboxylic acid containing 3 to 6 C atoms, and/or amide thereof, and 30% to 99.9% by weight of at least one ester of acrylic and/or methacrylic acid with alkanols containing 1 to 12 C atoms and/or styrene, or 0.1% to 5% by weight of at least one α,β-monoethylenically unsaturated monocarboxylic and/or dicarboxylic acid containing 3 to 6 C atoms, and/or amide thereof, and 30% to 99.9% by weight of styrene and/or butadiene, or 0.1% to 5% by weight of at least one α,β-monoethylenically unsaturated monocarboxylic and/or dicarboxylic acid containing 3 to 6 C atoms, and/or amide thereof, and 30% to 99.9% by weight of vinyl chloride and/or vinylidene chloride, or 0.1% to 5% by weight of at least one α,β-monoethylenically unsaturated monocarboxylic and/or dicarboxylic acid containing 3 to 6 C atoms, and/or amide thereof, and 30% to 99.9% by weight of vinyl acetate, vinyl propionate, vinyl esters of versatic acid, vinyl esters of long-chain fatty acids and/or ethylene.

In accordance with the invention it is preferred to use those mixtures of monomers M whose polymer obtainable by polymerization has a glass transition temperature ≥−50 and ≤180° C., more particularly ≥−10 and ≤120° C., and advantageously ≥0 and ≤100° C. For the skilled worker it is possible to set the glass transition temperature of the inventively obtainable polymer through the specific selection of the nature and amount of the monomers M. By the glass transition temperature (Tg) is meant the limit value of the glass transition temperature, toward which this value tends with increasing molecular weight, according to G. Kanig (Kolloid-Zeitschrift & Zeitschrift für Polymere, vol. 190, page 1, equation 1). The glass transition temperature is determined by the DSC method (differential scanning calorimetry, 20 K/min, midpoint measurement, DIN 53 765).

According to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980) it is the case that the glass transition temperature of copolymers with no more than low levels of crosslinking is given in good approximation by:

$$1/Tg = x1/Tg1 + x2/Tg2 + \ldots xn/Tgn,$$

where x1, x2, xn are the mass fractions of the monomers 1, 2, ... n and Tg1, Tg2, Tgn are the glass transition temperatures of the polymers synthesized in each case only from one of the monomers 1, 2, n, in degrees Kelvin. The Tg values for the homopolymers of the majority of monomers are known and are listed, for example, in Ullmann's Encyclopedia of Industrial Chemistry, 5th edn., vol. A21, page 169, Verlag Chemie, Weinheim, 1992; other sources of glass transition temperatures of homopolymers include, for example, J. Brandrup, E. H. Immergut, Polymer Handbook, 1st edn., J. Wiley, New York, 1966; 2nd edn. J. Wiley, New York, 1975; and 3rd edn., J. Wiley, New York, 1989.

With particular advantage the principal monomers M are selected from the group encompassing methyl acrylate, ethyl acrylate, n-butyl acrylate, tert-butyl acrylate, 2-ethylhexyl acrylate, 2-propylheptyl acrylate, methyl methacrylate, ethyl methacrylate, n-butyl methacrylate, tert-butyl methacrylate, 2-ethylhexyl methacrylate, 2-propylheptyl methacrylate, styrene, vinyltoluene, 2-methylstyrene, 4-methylstyrene, 2-n-butylstyrene, 4-n-butylstyrene, 4-n-decylstyrene, vinyl acetate, vinyl propionate, acrylonitrile, and methacrylonitrile.

In accordance with the invention it is possible in the context of the present process to use as well ≤1% by weight of at least one dispersing assistant, based on the total monomer amount. Suitable dispersing assistants include not only the protective colloids that are typically used for carrying out free-radical aqueous emulsion polymerizations, but also emulsifiers. Both classes of substance are familiar to the skilled worker.

Examples of suitable protective colloids include polyvinyl alcohols, polyalkylene glycols, alkali metal salts of polyacrylic acids and polymethacrylic acids, gelatin derivatives, or acrylic acid, methacrylic acid, maleic anhydride, 2-acrylamido-2-methylpropanesulfonic acid and/or 4-styrenesulfonic acid copolymers and their alkali metal salts, and also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. An exhaustive description of further suitable protective colloids is found in Houben-Weyl, Methoden der organischen Chemie, volume XIV/1, Makromolekulare Stoffe, Georg-Thieme-Verlag, Stuttgart, 1961, pages 411 to 420.

It will be appreciated that mixtures of protective colloids and/or emulsifiers can also be used. As dispersants it is common to make use exclusively of emulsifiers, whose relative molecular weights, in contradistinction to the protective colloids, are typically below 1000. They may be anionic, cationic or nonionic in nature. Where mixtures of surface-active substances are used it will be appreciated that the individual components must be compatible with one another, something which in case of doubt can be ascertained by means of a few preliminary tests. Generally speaking, anionic emulsifiers are compatible with one another and with nonionic emulsifiers. The same applies to cationic emulsifiers, whereas anionic and cationic emulsifiers are usually not compatible with one another. An overview of suitable emulsifiers is found in Houben-Weyl, Methoden der organischen Chemie, volume XIV/1, Makromolekulare Stoffe, Georg-Thieme-Verlag, Stuttgart, 1961, pages 192 to 208.

Used in particular as dispersants in accordance with the invention, however, are emulsifiers.

Customary nonionic emulsifiers are, for example, ethoxylated mono-, di-, and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A grades ($C_{12}C_{14}$ fatty alcohol ethoxylates, EO degree: 3 to 8), Lutensol® AO grades ($C_{13}C_{15}$ oxo alcohol ethoxylates, EO degree: 3 to 30), Lutensol® AT grades ($C_{16}C_{18}$ fatty alcohol ethoxylates, EO degree: 11 to 80), Lutensol® ON grades ($C_{10}$ oxo alcohol ethoxylates, EO degree: 3 to 11), and Lutensol® TO grades ($C_{13}$ oxo alcohol ethoxylates, EO degree: 3 to 20), all from BASF AG.

Typical anionic emulsifiers are, for example, alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$).

Compounds which have proven suitable as further anionic emulsifiers are, additionally, compounds of the general formula (I)

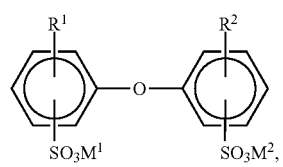

(I)

in which $R^1$ and $R^2$ are H atoms or $C_4$ to $C_{24}$ alkyl and are not simultaneously H atoms, and $M^1$ and $M^2$ can be alkali metal ions and/or ammonium ions. In the general formula (I) $R^1$ and $R^2$ are preferably linear or branched alkyl radicals having 6 to 18 C atoms, in particular having 6, 12, and 16 C atoms, or hydrogen, where $R^1$ and $R^2$ are not both simultaneously hydrogen atoms. $M^1$ and $M^2$ are preferably sodium, potassium or ammonium, particular preference being given to sodium. Particularly advantageous compounds (I) are those in which $M^1$ and $M^2$ are sodium, $R^1$ is a branched alkyl radical of 12 C atoms and, $R^2$ is a hydrogen atom or $R^1$. Frequently use is made of technical mixtures containing a fraction of 50% to 90% by weight of the monoalkylated product, an example being Dowfax® 2A1 (brand of the Dow Chemical Company). The compounds (I) are common knowledge, from U.S. Pat. No. 4,269,749 for example, and are available commercially.

Suitable cation-active emulsifiers are generally $C_6$ to $C_{18}$ alkyl-, $C_6$ to $C_{18}$ alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts and phosphonium salts. Examples that may be mentioned include dodecylammonium acetate or the corresponding sulfate, the sulfates or acetates of the various paraffinic acid 2-(N,N,N-trimethylammonio)ethyl esters, N-cetylpyridinium sulfate, N-laurylpyridinium sulfate, and N-cetyl-N,N,N-trimethylammonium sulfate, N-dodecyl-N,N,N-trimethylammonium sulfate, N-octyl-N,N,N-trimethlyammonium sulfate, N,N-distearyl-N,N-dimethylammonium sulfate, and the gemini surfactant N,N'-(lauryldimethyl)ethylenediamine disulfate, ethoxylated tallowyl-N-methylammonium sulfate and ethoxylated oleylamine (for example Uniperol® AC from BASF SE, about 12 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is advantageous if the anionic counter-groups are, as far as possible, of low nucleophilicity, such as, for example, perchlorate, sulfate, phosphate, nitrate, and carboxylates, such as acetate, trifluoroacetate, trichloroacetate, propionate, oxalate, citrate, and benzoate, and also conjugated anions of organic sulfonic acids, such as methylsulfonate, trifluoromethylsulfonate, and para-toluenesulfonate, and additionally tetrafluoroborate, tetraphenylborate, tetrakis (pentafluorophenyl)borate, tetrakis[bis(3,5-trifluoromethyl) phenyl]borate, hexafluorophosphate, hexafluoroarsenate or hexafluoroantimonate.

The total amount of the protective colloids and/or emulsifiers used as dispersing assistants is ≤1%, advantageously ≤0.5%, and with particular advantage ≤0.1%, by weight, based in each case on the total monomer amount. Frequently no dispersing assistants at all are used.

If, however, dispersing assistants are used, then it is possible to include at least a portion of the at least one dispersing assistant in the initial charge and to supply any remainder to the aqueous polymerization medium under polymerization conditions. It will be appreciated that it is also possible to meter in the entirety of the at least one dispersing assistant under polymerization conditions. In that case the respective metered addition of the dispersing assistant may take place under polymerization conditions discontinuously in one or more portions or continuously with changing or constant volume flow rates.

The polymerization reaction of the ethylenically unsaturated monomers M in the aqueous polymerization medium is initiated by means of at least one free-radical initiator. In this context it is possible in accordance with the invention to use all those free-radical initiators which are known to the skilled worker from free-radically initiated aqueous emulsion polymerization. These may in principle be both peroxides and azo compounds. It will be appreciated that redox initiator systems as well are suitable. Peroxides used may in principle be inorganic peroxides, such as hydrogen peroxide or peroxodisulfates, such as the mono- or di-alkali metal or ammonium salts of peroxodisulfuric acid, such as their mono- and di-sodium, -potassium or ammonium salts, for example, or organic peroxides, such as alkyl hydroperoxides, examples being tert-butyl, p-menthyl, and cumyl hydroperoxide, and also dialkyl or diaryl peroxides, such as di-tert-butyl peroxide or dicumyl peroxide. As an azo compound use is made substantially of 2,2''-azobis(isobutyronitrile), 2,2''-azobis(2,4-dimethylvaleronitrile), and 2,2"-azobis(amidinopropyl)dihydrochloride (AIBA, corresponding to V-50 from Wako Chemicals). Suitable oxidizing agents for redox initiator systems include substantially the aforementioned peroxides. As corresponding reducing agents it is possible to use sulfur compounds with a low oxidation state, such as alkali metal sulfites, examples being potassium and/or sodium sulfite, alkali metal hydrogensulfites, examples being potassium and/or sodium hydrogensulfite, alkali metal metabisulfites, examples being potassium and/or sodium metabisulfite, formaldehyde-sulfoxylates, examples being potassium and/or sodium formaldehyde-sulfoxylate, alkali metal salts, especially potassium salts and/or sodium salts, of aliphatic sulfinic acids, and alkali metal hydrogensulfides, such as potassium and/or sodium hydrogensulfide, salts of polyvalent metals, such as iron(II) sulfate, iron(II) ammonium sulfate, iron(II) phosphate, endiols, such as dihydroxymaleic acid, benzoin and/or ascorbic acid, and reducing saccharides, such as sorbose, glucose, fructose and/or dihydroxyacetone. In general the amount of free-radical initiator used, based on the total monomer amount, is $\geq 0.01\%$ and $\leq 5\%$, preferably $\geq 0.1\%$ and $\leq 3\%$, and more preferably $\geq 0.2\%$ and $\leq 1.5\%$ by weight.

In accordance with the invention the entirety of the free-radical initiator can be included in the initial charge in the aqueous polymerization medium before initiation of the polymerization reaction. An alternative possibility is to include, optionally, only a portion of the free-radical initiator in the initial charge in the aqueous polymerization medium before initiation of the polymerization reaction and then under polymerization conditions to add the entirety or the remainder, optionally, at the rate at which it is consumed in the course of the free-radical polymerization reaction of the invention, such addition taking place continuously or discontinuously.

By highly branched polymers are meant, in the context of this invention, very generally, polymers which feature a highly branched structure and a high functionality. Regarding the general definition of highly branched polymers, reference is also made to P. J. Flory, J. Am. Chem. Soc. 1952, 74, pages 2718 to 2723, and H. Frey et al., Chem. Eur. J. 2000, 6, No. 14, pages 2499 to 2506 (where, in deviation from the definition selected here, they are referred to as "hyperbranched polymers").

The highly branched polymers in the context of the invention include, specifically, dendritic polymers, consisting of the groups of the dendrimers and of the hyperbranched polymers.

In structural terms, dendrimers derive from star polymers, but the individual chains are in turn each branched in star formation and are identical to one another, producing a highly symmetrical structure. Dendrimers come about on the basis of small molecules to which, via a continually repeating, defined reaction sequence, monomers bearing branching units are added. Hence with each reaction step the number of monomer end groups grows exponentially, ultimately producing a tree structure which in the ideal case is spherical. On the basis of its uniform construction (in the ideal case, all branches contain exactly the same number of monomer units), dendrimers are substantially monodisperse, i.e., they have, generally, a defined molar mass.

Both molecularly and structurally uniform highly branched polymers are also referred to below, uniformly, as dendrimers.

By hyperbranched polymers are meant, in the context of this invention, highly branched polymers which, in contrast to the aforementioned dendrimers, are both molecularly and structurally nonuniform. They have side chains and/or side branches of different lengths and branching statuses, and also have a molar mass distribution (polydispersity).

Highly branched polymers can be characterized by their degree of branching (DB). This degree of branching DB is defined as $$DB(\%) = (T+Z)/(T+Z+L) \times 100, \text{ where}$$

T is the average number of terminally attached monomer units,
Z is the average number of monomer units which form branches, and
L is the average number of linearly attached monomer units.

Highly branched polymers in the context of this invention have a degree of branching DB of 10% to 100%, preferably 10% to 90%, and more preferably 10% to 80%.

Dendrimers generally have a degree of branching DB of at least 99%, more particularly 99.9% to 100%.

Hyperbranched polymers have a degree of branching DB of 10% to 95%, preferably 25% to 90%, and more preferably 30% to 80%.

In the context of the process of the invention for preparing an aqueous dispersion of polymer particles it is possible in principle to use not only the structurally and molecularly uniform dendrimers but also the molecularly and structurally nonuniform hyperbranched polymers.

Hyperbranched polymers are generally simpler and hence more economic to prepare than dendrimers. Thus, for example, the preparation of the monodisperse dendrimers is complicated by the fact that, at each linking step, protective groups must be introduced and then removed again. In contrast, the synthesis of hyperbranched polymers can in many cases take place in a one-pot reaction. Various synthetic approaches to the preparation of hyperbranched polymers are described in, for example, C. Gao, D. Yan, Prog. Polym. Sci. 29 (2004), pages 183 to 275.

Highly branched polymers that are suitable in accordance with the invention are obtainable in principle by polycondensation or polyaddition. Polycondensation means the repeated chemical reaction of functional compounds with suitable reactive compounds, with elimination of compounds of low molecular mass, such as water, alcohol or HCl, for example. Polyaddition means the repeated chemical reaction of functional compounds with suitable reactive compounds without elimination of compounds of low molecular mass.

Suitable in accordance with the invention are highly branched polymers which contain groups formed by polyaddition or polycondensation, these groups being selected preferably from ether groups, ester groups, carbonate groups, amino groups, amide groups, urethane groups, and urea groups.

Suitable in accordance with the invention are highly branched polymers which, furthermore, contain functional groups preferably selected from hydroxyl groups, and also from carboxlylic acid groups, sulfonic acid groups or phosphonic acid groups.

More particularly it is possible as highly branched polymers to use polycarbonates, polyesters, polyethers, polyurethanes, polyureas, polyamides, and also their hybrid forms, such as, for example, poly(ureaurethanes), poly(etheramines), poly(esteramines), poly(etheramides), poly(esteramides), poly(amidoamines), poly(estercarbonates), poly(ethercarbonates), poly(etheresters), poly(etherestercarbonates) etc.

The preparation of highly branched polymers is described more particularly in the following documents:
WO-A 2005/026234 (highly branched and especially hyperbranched polycarbonates), WO-A 01/46296, DE-A 10163163, DE-A 10219508 and DE-A 10240817 (hyperbranched polyesters), WO-A 09/101,141, WO-A 03/062306, WO-A 00/56802, DE-A 10211664 and DE-A 19947631 (hyperbranched polyethers), WO-A 06/087227 [hyperbranched polymers containing nitrogen atom, especially polyurethanes, polyureas, polyamides, poly(esteramides), poly(esteramines)], WO-A 97/02304 and DE-A 19904444 [hyperbranched polyurethanes and hyperbranched poly(ureaurethanes)], WO-A 03/066702, WO-A 05/044897 and WO-A 05/075541 (hyperbranched polyureas), WO-A 05/007726 [hyperbranched, amino-containing polymers, especially poly(esteramines)], WO-A 99/16810 and EP-A 1036106 [hyperbranched poly (esterimides)], WO-A 06/018125 (hyperbranched polyamides) and WO-A 06/089940 [hyperbranched poly(estercarbonates)].

Use is made in accordance with the invention of highly branched polymers which contain ≥0.3 mmol, advantageously ≥0.5 and ≤20 mmol, and preferably ≥0.5 and ≤15 mmol of acid groups per gram of highly branched polymer. In the context of the present invention, acid groups include all those functional groups which at 20° C. in deionized water with a pH of ≥2 and ≤10 are able to undergo transition to their ionized form by giving up protons. The acid groups in this context are advantageously selected from carboxylic acid groups ($—CO_2H$), sulfonic acid groups ($—SO_3H$) and/or phosphonic acid groups ($—PO_3H_2$), with particular preference being given to the carboxylic acid groups. It will be appreciated that, in accordance with the invention, the intention is to encompass as well the salts of the aforementioned acids, more particularly their alkali metal salts and ammonium salts.

The preparation of the highly branched polymers containing acid groups is familiar to the skilled worker.

Thus, for example, the highly branched polymers containing carboxylic acid groups may be obtained by reaction of these highly branched polymers containing hydroxyl and/or primary and secondary amino groups with carbonyl chlorides or cyclic carboxylic anhydrides, as disclosed for example in WO 2006/089940 using highly branched polycarbonates as an example. The amount of carboxylic acid groups in mg of KOH per gram of highly branched polymer can be determined analytically through determination of the acid number in accordance with DIN 53402 and converted correspondingly into mmol of carboxylic acid groups per gram of polymer.

Highly branched polymers containing sulfonic acid groups can be obtained, for example, by reaction of at least trifunctional alcohols with at least difunctional isocyanates to form a highly branched polyurethane, with subsequent reaction of the polyurethane's residual isocyanate groups with sodium 2-aminoethanesulfonate. The synthesis of hyperbranched polyurethanes is described in WO 2004/101624, for example. In contradistinction to that specification, the at least trifunctional alcohols used with preference in the context of this invention are alkoxylates of glycerol or trimethylolpropane, which have been reacted with a 1 to 20 molar excess of ethylene oxide, propylene oxide or a mixture of both. The amount of sulfonic acid groups in mmol per gram of highly branched polymer can be determined via elemental analysis, by determination of the sulfur content of the hyperbranched polymer of the invention containing sulfonic acid groups.

In addition to the acid groups, the highly branched polymers containing acid groups preferably contain hydroxyl and/or amino groups. Such groups are present, for example, in the highly branched polymer when said highly branched polymer is a polycarbonate, polyester, polyether, polyurethane, polyurea, polyamide, or hybrid form thereof, such as, for example, poly(ureaurethanes), poly(etheramines), poly(esteramines), poly(etheramides), poly(esteramides), poly(amidoamines), poly(estercarbonates), poly(ethercarbonates), poly(etheresters), poly(etherestercarbonates).

It is likewise advantageous if the highly branched polymer containing acid groups or the acid-group-containing polymers containing hydroxyl and/or amino groups also, additionally, contain ethylenically unsaturated double bonds. Such groups are present, for example, in the highly branched polymer when the highly branched polymer is a polyester obtained by reaction of at least one at least trifunctional alcohol with at least one at least difunctional carboxylic acid, with at 25% by weight of at least difunctional carboxylic acid being selected from maleic acid, fumaric acid, itaconic acid or derivatives thereof such as, for example, anhydrides or monoalkyl and dialkyl esters, and this polyester, during or after its synthesis, is provided with additional carboxylic acid groups through reaction with carbonyl chlorides or cyclic carboxylic anhydrides.

Such ethylenically unsaturated groups are also present, for example, in hyperbranched polycarbonates obtained by reaction of at least one at least trifunctional alcohol with at least one organic carbonate, with the possibility, during or after the synthesis, of modification with compounds which possess ethylenically unsaturated double bonds and also functional groups that are reactive toward hydroxyl and/or carbonate groups. Examples of suitable compounds include isoprenol, acrylic acid, methacrylic acid, maleic acid, fumaric acid, itaconic acid or derivatives thereof such as, for example, anhydrides or monoalkyl and/or dialkyl esters.

The acid-group-containing, highly branched polymers which can be used in accordance with the invention generally have a number-average molecular weight ≥700 and ≤100 000 g/mol, advantageously ≥1000 and ≤50 000 g/mol. Determination of the number-average molecular weight is familiar to the skilled worker and is accomplished preferably by gel permeation chromatography, using polymethyl methacrylate as standard and tetrahydrofuran or dimethylacetamide as eluent, depending on the solvent in which the sample has the better solubility. The method is described in Analytiker Taschenbuch vol. 4, pages 433 to 442, Berlin 1984.

The amount of highly branched polymer used in accordance with the invention is ≥5% and ≤60%, preferably ≥5% and ≤30%, and more preferably ≥5% and ≤25% by weight, based in each case on the total monomer amount.

It is essential to the invention that into the aqueous polymerization medium is introduced initially only ≥10% by weight of the total amount of the at least one highly branched polymer and optionally ≤50% by weight of the total amount of the at least one ethylenically unsaturated monomer M and subsequently, under polymerization conditions, any remainder of the at least one highly branched polymer is added and the total amount or any remainder of the at least one ethylenically unsaturated monomer M is added, and polymerization is carried out to a monomer conversion ≥80% by weight.

In accordance with the invention ≥10%, advantageously ≥50%, preferably ≥90% by weight of the total amount of the at least one highly branched polymer is included in the initial charge in the aqueous polymerization medium before the polymerization is initiated. With particular advantage the entirety of the at least one highly branched polymer is included in the initial charge in the aqueous polymerization medium. Any remainders of the highly branched polymer can be metered in to the aqueous polymerization medium under polymerization conditions, dicontinuously in one or more portions, or continuously with constant or varying flow rates.

It is essential to the invention that ≤50% by weight of the total monomer amount is included in the initial charge in the aqueous polymerization medium. Frequently ≤20% or ≤10% by weight is included in the initial charge in the aqueous polymerization medium. It is also possible, however, not to include any monomer M in the initial charge in the aqueous polymerization medium. The entirety or any remainder of the monomer M can be metered in to the aqueous polymerization medium under polymerization conditions, discontinuously in one or more portions, or continuously with constant or varying flow rates. It is also possible for the composition of the monomers M to change in the course of the metered addition (staged or gradient procedure, for example).

Where a portion of the monomers M is included in the initial charge, then this initial charge procedure takes place under conditions which are not apt to polymerize the monomers M. For example, no free-radical initiator is included in the initial charge, or, if free-radical initiator is included in the initial charge, then this is done under temperature conditions and/or pressure conditions which are not apt to initiate the decomposition of the free-radical initiator.

With particular advantage the monomers M are added under polymerization conditions continuously with constant flow rates. The monomers M are advantageously added in bulk. Advantageously in accordance with the invention, the addition of the monomers M under polymerization conditions takes place such that at any point in time in the addition, ≥80%, advantageously ≥90%, by weight of the total monomers M already added have undergone polymerization. The appropriate measures to ensure this are familiar to the skilled worker (use of a reaction calorimeter, for example).

In the context of the present invention, polymerization conditions are understood generally to refer to those temperatures and pressures under which the free-radically initiated polymerization reaction proceeds with a sufficient polymerization rate. The polymerization conditions are dependent in particular on the free-radical initiator used. Advantageously, the nature and amount of the free-radical initiator, the polymerization temperature, and the polymerization pressure are selected such that there are always sufficient initiating radicals available to initiate and maintain, respectively, the polymerization reaction. More particularly the polymerization temperature and polymerization pressure are selected such that the half-life of the free-radical initiator used is ≤3 hours, advantageously ≤1 hour, and with particular advantage ≤30 minutes.

Reaction temperatures contemplated for the process of the invention span the whole range from 0 to 170° C. It is usual to employ temperatures of 50 to 120° C., frequently 60 to 110° C., and often 70 to 100° C. The process of the invention can be carried out under a pressure of less than, equal to or greater than 1 atm [1.013 bar (absolute) atmospheric pressure], and so the polymerization temperature may exceed 100° C. and may be up to 170° C. Highly volatile monomers, such as ethylene, butadiene or vinyl chloride, for example, are polymerized preferably under elevated pressure. In that case the pressure may adopt values of 1.2, 1.5, 2, 5, 10 or 15 bar (absolute) or even higher values. Where polymerization reactions are carried out at subatmospheric pressure, the pressures set are 950 mbar, frequently 900 mbar and often 850 mbar (absolute). The process of the invention is carried out advantageously at 1 atm in the absence of oxygen, for example under an inert gas atmosphere, such as under nitrogen or argon, for example.

The aqueous polymerization medium may optionally further comprise small amounts, generally ≤10%, frequently ≤5%, and often ≤1%, by weight of a water-soluble organic solvent having a solubility ≥200 g per 1000 g of deionized water at 20° C. and 1 atm (absolute), based on the total amount of water in the aqueous polymer dispersion. Examples include aliphatic $C_1$ to $C_5$ alcohols, such as methanol, ethanol, n-propanol, isopropanol, n-butanol, and also isomers thereof, n-pentanol and also its isomeric compounds, etc., aliphatic C3 to C4 ketones, such as acetone or ethyl methyl ketone, and also cyclic ethers, such as tetrahydrofuran or dioxane. It is advantageous in accordance with the invention not to use any organic solvent.

With advantage in accordance with the invention the aqueous polymerization medium has a pH in the range ≥2 and ≤10, preferably ≥5 and ≤9, and more preferably ≥7 and ≤8.5. Adjusting the pH is familiar to the skilled worker and is accomplished advantageously using inorganic or organic acids, such as hydrochloric acid, sulfuric acid or acetic acid, inorganic bases, such as sodium hydroxide, potassium hydroxide or ammonium hydroxide, or typical buffer mixtures, for example. The pH of the aqueous polymerization medium is measured at room temperature using a standard commercial calibrated pH meter.

With particular advantage the process of the invention takes place such that the monomers M are reacted under polymerization conditions to a conversion of ≥80%, advantageously ≥95%, and with particular advantage ≥99% by weight. Frequently it is advantageous if the aqueous polymer dispersion that is obtained after the end of the polymerization is subjected to an aftertreatment for the purpose of lowering the residual monomer content. This aftertreatment is either chemical, accomplished for example by completing the polymerization reaction through the use of a more effective free-radical initiator system (referred to a postpolymerization), and/or physically, as for example by stripping of the aqueous polymer dispersion with steam or inert gas. Appropriate chemical and/or physical methods are familiar to the skilled worker [see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115]. The combination of chemical and physical aftertreatment affords the advantage that not only the unreacted monomers M but also other disruptive highly volatile organic constituents (known as VOCs [volatile organic compounds]) are removed from the aqueous polymer dispersion.

The polymer particles obtainable by the process of the invention have a number-average particle diameter as determined via quasielastic light scattering (ISO standard 13 321) (cumulant z-average)>0 and ≤100 nm. Advantageously the number-average particle diameter is ≥5 and ≤90 nm and with particular advantage ≥10 and ≤70 nm.

The aqueous polymer dispersions obtainable by the process of the invention contain polymer particles which in general have a narrow size distribution.

A narrow particle size distribution for the purposes of this specification means that the ratio of the weight-average particle diameter $D_w 50$ to the number-average particle diameter $D_n 50$ [$D_w 50/D_n 50$] as determined by the method of the analytical ultracentrifuge (in this regard, cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175) is ≤2.0, preferably ≤1.5, and more preferably ≤1.2 or ≤1.1.

The aqueous polymer dispersions obtained in accordance with the invention typically have solids contents of ≥5% and ≤70%, frequently ≥10% and ≤50%, and often ≥15% and ≤40%, by weight, based in each case on the aqueous polymer dispersion.

It is essential that the aqueous polymer dispersion of the invention may optionally also comprise further auxiliaries familiar to the skilled worker, such as, for example, those known as thickeners, defoamers, neutralizing agents, buffer substances and/or preservatives.

The aqueous polymer dispersions of the invention are suitable with advantage for producing adhesives, sealants, polymeric renders, paper coating slips, fiber nonwovens, coating compositions, cosmetics formulations, and foams, and also for modifying mineral binders and plastics.

Furthermore, the corresponding polymer powders are obtainable in a simple way (for example by freeze or spray drying) from the aqueous polymer dispersions of the invention. These inventively obtainable polymer powders can likewise be used for producing adhesives, sealants, polymeric renders, paper-coating slips, fiber nonwovens, coating compositions, cosmetics formulations, and foams, and also for modifying mineral binders and plastics.

The purpose of the nonlimiting examples below is to illustrate the invention.

EXAMPLES

Polyol 1: polyetherol based on trimethylolpropane (TMP) reacted statistically per mole with 5.2 mol of propylene oxide.

Polyol 2: polyetherol based on trimethylolpropane (TMP) reacted statistically per mole with 15.6 mol of propylene oxide.

DBTL is the abbreviation for the catalyst di-n-butyltin dilaurate

The highly branched polymers were analyzed by gel permeation chromatography using a refractometer as the detector. The mobile phase used was tetrahydrofuran (THF) or dimethylacetamide (DMAc), while the standard used for determining the molecular weight was polymethyl methacrylate (PMMA). The OH number was determined in accordance with DIN 53240, part 2. The acid number was determined in accordance with DIN 53402.

The NCO content was determined in accordance with DIN EN ISO 11909.

a) Preparation of the Highly Branched Polymers

Example 1

Highly Branched Polymer 1 (HBP1)

A 4 l glass flask equipped with stirrer, internal thermometer, and reflux condenser was charged at room temperature with 2150 g of polyol 1, 709 g of diethyl carbonate, and 0.9 g of solid potassium hydroxide. The reaction mixture was heated to 140° C. with stirring and was held at boiling until the temperature of the reaction mixture had dropped, as a result of the evaporative cooling effect of the ethanol liberated, to a constant temperature of approximately 110° C. The reflux condenser was then switched for a descending condenser with collecting vessel, and the distillate formed during the reaction was removed, in the course of which the temperature of the reaction mixture was raised to 220° C. The distillate was collected in a chilled round-bottomed flask and weighed, and in this way the conversion was determined as a percentage relative to the theoretically possible complete conversion. When a conversion of 94% was attained, the reaction mixture was cooled to room temperature and brought to a pH of 7 by addition of 85% strength by weight aqueous phosphoric acid. The reaction mixture was then heated again, and dry nitrogen was passed through it at a temperature of 200° C. for 4 hours in order to remove residual quantities of volatile constituents. Thereafter the reaction was ended by cooling to room temperature. The inventive polymer 1 (precursor) was obtained in the form of a pale yellow oil.

Subsequently, 830 g of the aforementioned highly branched polymer precursor were admixed at room temperature with 215 g of succinic anhydride, and this mixture was heated to 100° C. with stirring and stirred at that temperature for 5 hours. The reaction was subsequently ended by cooling to room temperature. HBP 1 was obtained as a yellow oil (GPC (THF): Mn=1540 g/mol, Mw=15210 g/mol; OH number=18 mg KOH per gram of HBP1; acid number=122 mg KOH per gram of HBP1)

Example 2

Highly Branched Polymer 2 (HBP2)

A 4 l glass flask equipped with stirrer, internal thermometer, and reflux condenser was charged at room temperature with 435 g of 2,4-tolylene diisocyanate. Over a period of 50 minutes, 1075 g of polyol 1 were then added with stirring at a rate such that the internal temperature within the reaction flask did not exceed 40° C. When the addition had been made, the reaction mixture was stirred at 35° C. for 0.5 hour until an NCO content of 7.6% by weight was reached. Subsequently a further 1175 g of polyol 1 were added and the reaction mixture was stirred at room temperature for 16 hours, the NCO content dropping to 0% by weight. This gave 2300 g of highly branched polymer 2 (precursor).

Subsequently, 1000 g of the aforementioned highly branched polymer precursor were admixed at room temperature with 250 g of succinic anhydride, and this mixture was heated to 110° C. with stirring and stirred at that temperature for 6 hours. The reaction was subsequently ended by cooling to room temperature. HBP 2 was obtained as a yellow oil (GPC (THF): Mn=1380 g/mol, Mw=5330 g/mol; OH number=74 mg KOH per gram of HBP2; acid number=115 mg KOH per gram of HBP2)

Example 3

Highly Branched Polymer 3 (HBP3)

A 5 l four-neck flask equipped with stirrer, internal thermometer, and reflux condenser was charged at room temperature with 3010 g of polyol 1, 1034 g of diethyl carbonate, and 0.9 of solid potassium hydroxide. The reaction mixture was heated to boiling with stirring and was maintained at boiling until the boiling temperature of the reaction mixture, as a result of the evaporative cooling effect of the ethanol liberated, had dropped to a constant temperature (approximately 126° C.). The reflux condenser was then switched for a descending condenser with collecting vessel, and the distillate formed was removed, the temperature of the reaction mixture being increased to 190° C. When distillate was no longer produced, the reaction mixture was cooled to room temperature and brought to a pH of 7 by addition of 85% strength by weight aqueous phosphoric acid. Then residual volatile constituents were removed by heating the reaction mixture with stirring and evacuating it, and subsequently maintaining it at 100 mbar (absolute) at a temperature of 140° C. for 30 minutes. Thereafter the batch was cooled to room temperature. Polymer 3 (precursor) was obtained in the form of a pale yellow oil.

Subsequently, at room temperature, 700 g of the above-stated highly branched polymer precursor were admixed with 142 g of succinic anhydride and this mixture was heated to 130° C. and stirred at that temperature for 2 hours. The reaction mixture was then cooled to 60° C., and the succinic anhydride which had sublimed in the reflux condenser was added to the reaction mixture again by washing it down with 5 ml of acetone. With distillative removal of the acetone, the reaction mixture was heated again to 130° C. over the course of 1 hour and was stirred at that temperature for a further 30 minutes. Subsequently the reaction was ended by cooling to room temperature. HBP3 was obtained in the form of a yellow oil (GPC (DMAc): Mn=2200 g/mol, Mw=21 500 g/mol; OH number=54 mg KOH per gram of HBP3; acid number=102 mg KOH per gram of HBP3).

Example 4

Highly Branched Polymer 4 (HBP 4)

A 4 l glass flask equipped with stirrer, internal thermometer, and ascending condenser with collecting vessel was charged at room temperature with 2048 g of polyol 2, 174 g of maleic anhydride, and 0.1 g of DBTL. The reaction mixture was heated to 180° C. with stirring and was held at that temperature until the acid number of the reaction mixture had dropped to 43 mg KOH per gram of polymer. The reaction was then ended by cooling to room temperature. Subsequently the reaction mixture was admixed at room temperature with 275 g of succinic anhydride, heated to 130° C. with stirring, and stirred at that temperature for 2 hours. Thereafter the reaction was ended by cooling to room temperature. HBP4 was obtained in the form of a yellow oil (GPC (DMAc): Mn=1700 g/mol, Mw=3600 g/mol, OH number=59 mg KOH per gram of HBP4; acid number=104 mg KOH per gram of HBP4).

Example 5

Highly Branched Polymer 5 (HBP5)

A 2 l four-neck flask equipped with stirrer, internal thermometer, and reflux condenser was charged at room temperature with 200 g of hexamethylene diisocyanate. Then, over a period of 5 minutes, 1236 g of polyol 2 admixed with 0.1 g of benzoyl chloride were added with stirring at a rate such that the internal temperature within the reaction flask did not exceed 40° C. When the addition had been made, the reaction mixture was stirred at 50-60° C. for 2.5 hours. The reaction mixture obtained had an NCO content of 4.7% by weight. Subsequently the reaction mixture was admixed with 0.2 g of DBTL and was further stirred at 60° C. until an NCO content of 3.6% by weight was reached. Thereafter the reaction was stopped by addition of a solution of 160 g of 2-aminopropanesulfonic acid and 51 g of sodium hydroxide in 1200 g of deionized water and was cooled to room temperature. HBP5 was obtained in the form of a colorless, viscous mass (GPC (DMAc): Mn=2395 g/mol, Mw=30 900 g/mol).
b) Preparation of Aqueous Polymer Dispersions Example 6

A 2 l glass flask equipped with a stirrer and 4 metering devices was charged at room temperature and under a nitrogen atmosphere with 642 g of deionized water, 9.2 g of a 25% strength by weight aqueous ammonium hydroxide solution, and 30 g of HBP1. The mixture was stirred at room temperature for two hours and then heated. When a temperature of 95° C. was reached, feed 1 was metered in over a period of 2 hours and feed 2 over a period of 3 hours, the feeds beginning simultaneously and taking place with constant flow rates. Subsequently the polymerization mixture was left for a further 1.5 hours at 90° C. for postpolymerization, after which, beginning simultaneously, feed 3 and feed 4 were metered in over a period of 1 hour with constant flow rates. When the additions had been made, the contents of the reactor were cooled to room temperature and filtered through a 100 μm sieve.

| Feed 1: | |
|---|---|
| 107 g | styrene |
| 1.2 g | methacrylic acid |
| 12 g | 1,4-divinylbenzene |
| Feed 2: | |
| 109 g | deionized water |
| 1.2 g | ammonium persulfate |
| Feed 3: | |
| 48 g | deionized water |
| 2.4 g | tert-butyl hydroperoxide |
| Feed 4: | |
| 48 g | deionized water |
| 0.24 g | sodium bisulfite |
| 0.16 g | acetone |

The aqueous polymer dispersion obtained had a solids content of 14.7% by weight, based on the total weight of the aqueous dispersion. The glass transition temperature of the polymer particles was found to be 122° C. and their number-average diameter 27 nm.

The solids contents were determined, generally, by drying a defined amount (approximately 0.8 g) of the aqueous polymer dispersion to constant weight using an HR73 moisture analyzer from Mettler Toledo, at a temperature of 130° C. (approximately 2 hours). Two measurements were carried out in each case. The figure reported in each case represents the average of these measurements.

The number-average particle diameters of the polymer particles were determined, generally, by dynamic light scattering on an aqueous polymer dispersion with a concentration of 0.005 to 0.01 percent by weight, at 23° C., using an Autosizer IIC from Malvern Instruments, England. The parameter reported is the average diameter of the cumulant evaluation (cumulant z average) of the measured autocorrelation function (ISO standard 13321).

The glass transition temperature was determined, generally, by the DSC method using a differential scanning calorimeter from Mettler Toledo (differential scanning calorimetry, 20 K/min, midpoint measurement, DIN 53 765).

Example 7

A 2 l glass flask equipped with a stirrer and 4 metering devices was charged at room temperature and under a nitrogen atmosphere with 600 g of deionized water, 11.5 g of a 25% strength by weight aqueous ammonium hydroxide solution, and 30 g of HBP2. The mixture was stirred at room temperature for two hours and then heated. When a temperature of 95° C. was reached, feed 1 was metered in over a period of 2 hours and feed 2 over a period of 3 hours, the feeds beginning simultaneously and taking place with constant flow rates. Subsequently the polymerization mixture was left for a further 1.5 hours at 90° C. for postpolymerization. Thereafter, the polymerization mixture was cooled to room temperature and was filtered through a 100 μm sieve.

| Feed 1: | |
| --- | --- |
| 112 g | styrene |
| 48 g | 1,4-divinylbenzene |
| Feed 2: | |
| 208 g | deionized water |
| 1.6 g | ammonium persulfate |

The aqueous polymer dispersion obtained had a solids content of 19.6% by weight, based on the total weight of the aqueous dispersion. The glass transition temperature of the polymer particles was found to be 185° C. and their number-average diameter 43 nm.

Example 8

A 2 l glass flask equipped with a stirrer and 4 metering devices was charged at room temperature and under a nitrogen atmosphere with 460 g of deionized water, 0.5 g of a 25% strength by weight aqueous ammonium hydroxide solution, 3 g of HBP3, and 10 g of feed 1. The mixture was stirred at room temperature for two hours and then heated. When a temperature of 95° C. was reached, the remainder of feed 1 and the entirety of feed 3 were metered in over a period of 2 hours, and feed 2 was metered in over a period of 3 hours, the feeds beginning simultaneously and being metered in with constant flow rates. Subsequently the polymerization mixture was left for a further 1.5 hours at 90° C. for postpolymerization. Thereafter, the polymerization mixture was cooled to room temperature and was filtered through a 100 μm sieve.

| Feed 1: | |
| --- | --- |
| 89 g | styrene |
| 1.0 g | methacrylic acid |
| 10 g | 1,4-divinylbenzene |
| Feed 2: | |
| 130 g | deionized water |
| 1.0 g | ammonium persulfate |
| Feed 3: | |
| 300 g | deionized water |
| 17 g | HBP3 |
| 4.6 g | 25% strength by weight aqueous ammonia solution |

The aqueous polymer dispersion obtained had a solids content of 11.7% by weight, based on the total weight of the aqueous dispersion. The glass transition temperature of the polymer particles was found to be 122° C. and the number-average diameter 51 nm.

Example 9

A 2 l glass flask equipped with a stirrer and 4 metering devices was charged at room temperature and under a nitrogen atmosphere with 288 g of deionized water, 12.3 g of a 25% strength by weight aqueous ammonium hydroxide solution, and 80 g of HBP4. The mixture was stirred at room temperature for two hours and then heated. When a temperature of 95° C. was reached, feed 1 was metered in over a period of 3 hours and feed 2 over a period of 3.5 hours, the feeds beginning simultaneously and taking place with constant flow rates. Subsequently the polymerization mixture was left for a further 1.5 hours at 90° C. for postpolymerization. Thereafter, the polymerization mixture was cooled to room temperature and was filtered through a 100 μm sieve.

| Feed 1: | |
| --- | --- |
| 320 g | styrene |
| Feed 2: | |
| 200 g | deionized water |
| 4.0 g | ammonium persulfate |

The aqueous polymer dispersion obtained had a solids content of 44.3% by weight, based on the total weight of the aqueous dispersion. The glass transition temperature of the polymer particles was found to be 105° C. and the number-average diameter 55 nm.

Example 10

A 2 l glass flask equipped with a stirrer and 4 metering devices was charged at room temperature and under a nitrogen atmosphere with 624 g of deionized water, 12.3 g of a 25% strength by weight aqueous ammonium hydroxide solution, and 80 g of HBP5. The mixture was stirred at room temperature for two hours and then heated. When a temperature of 95° C. was reached, feed 1 was metered in over a period of 2 hours and feed 2 over a period of 3 hours, the feeds beginning simultaneously and taking place with constant flow rates. Subsequently the polymerization mixture was left for a further 1 hour at 90° C. for postpolymerization. Thereafter, the polymerization mixture was cooled to room temperature and was filtered through a 100 μm sieve.

| Feed 1: | |
| --- | --- |
| 112 g | methyl methacrylate |
| 48 g | n-butyl acrylate |
| Feed 2: | |
| 96 g | deionized water |
| 1.6 g | ammonium persulfate |

The aqueous polymer dispersion obtained had a solids content of 20.3% by weight, based on the total weight of the aqueous dispersion. The glass transition temperature of the polymer particles was found to be 39.8° C. and the number-average diameter 47 nm.

Example 11

Comparative

Comparative example 11 was prepared using 5% by weight of HBP, based on the total amount of the monomers. Of this quantity of HBP, 5% was included in the initial charge and 95% was metered in.

A 2 l glass flask equipped with a stirrer and 4 metering devices was charged at room temperature and under a nitrogen atmosphere with 550 g of deionized water and 5 g of feed 3. The mixture was stirred at room temperature for two hours and then heated. When a temperature of 95° C. was reached, feed 1 and the remainder of feed 3 were metered in over a period of 3 hours, and feed 2 was metered in over a period of 3.5 hours, the feeds beginning simultaneously and being metered in with constant flow rates. Subsequently the polymerization mixture was left for a further 1.5 hours at 90° C. for postpolymerization. Thereafter, the polymerization mixture was cooled to room temperature and was filtered through a 100 μm sieve.

| Feed 1: | |
|---|---|
| 98 g | styrene |
| 2.0 g | 1,4-divinylbenzene |
| Feed 2: | |
| 130 g | deionized water |
| 1.0 g | ammonium persulfate |
| Feed 3: | |
| 100 g | deionized water |
| 5 g | HBP3 |
| 1.2 g | 25% strength by weight aqueous ammonia solution |

The aqueous polymer dispersion obtained had a solids content of 11.6% by weight, based on the total weight of the aqueous dispersion. The glass transition temperature of the polymer particles was found to be 110° C. and the number-average diameter 117 nm.

Example 12

Comparative

Comparative example 12 was prepared with 1% by weight of HBP, based on the total amount of the monomers. The entire amount of the HBP was included in the initial charge.

A 2 l glass flask equipped with a stirrer and 4 metering devices was charged at room temperature and under a nitrogen atmosphere with 744 of deionized water, 0.2 g of a 25% strength by weight aqueous ammonium hydroxide solution, and 1.20 g of HBP2. The mixture was stirred at room temperature for two hours and then heated. When a temperature of 95° C. was reached, feed 1 was metered in over a period of 2 hours and feed 2 over a period of 3 hours, the feeds beginning simultaneously and taking place with constant flow rates. Approximately 40 minutes after the beginning of feeds 1 and 2, severe flocculation occurred, which meant that the experiment had to be terminated.

| Feed 1: | |
|---|---|
| 94.8 g | styrene |
| 24 g | 1,4-divinylbenzene |
| 1.2 g | methacrylic acid |
| Feed 2: | |
| 156 g | deionized water |
| 1.2 g | ammonium persulfate |

The invention claimed is:

1. A process for preparing an aqueous dispersion of polymer particles having a number-average particle diameter from 5 to 90 nm by free-radically initiated polymerization of at least one ethylenically unsaturated monomer M in the presence of at least one free-radical initiator and at least one highly branched polymer in an aqueous polymerization medium, the polymerization being carried out using ≤1% by weight, including 0%, of at least one dispersing assistant and ≥5% and ≤60% by weight of the at least one highly branched polymer, based on the total amount of the at least one ethylenically unsaturated monomer M (total monomer amount), and the at least one highly branched polymer containing ≥0.3 mmol of acid groups per gram of highly branched polymer, which process comprises introducing in the aqueous polymerization medium initially only ≥10% by weight of the total amount of the at least one highly branched polymer and optionally ≤50% by weight of the total amount of the at least one ethylenically unsaturated monomer M and subsequently, under polymerization conditions, adding any remainder of the at least one highly branched polymer, and adding the total amount or any remainder of the at least one ethylenically unsaturated monomer M, and carrying out polymerization to a monomer conversion ≥80% by weight.

2. The process according to claim 1, wherein the at least one highly branched polymer contains ≥0.5 and ≤20 mmol of acid groups per gram of highly branched polymer.

3. The process according to claim 1, wherein the acid groups of the at least one highly branched polymer are selected from carboxylic acid groups ($-CO_2H$), sulfonic acid groups ($-SO_3H$) and/or phosphonic acid groups ($-PO_3H_2$).

4. The process according to claim 1, wherein the at least one highly branched polymer is a dendritic polymer.

5. The process according to claim 1, wherein the at least one highly branched polymer has a number-average molecular weight ≥700 and ≤50 000 g/mol.

6. The process according to claim 1, wherein the total amount of the at least one highly branched polymer is ≥5% and ≤30% by weight, based on the total monomer amount.

7. The process according to claim 1, wherein the total amount of the at least one highly branched polymer is included in the initial charge.

8. The process according to claim 1, wherein the total amount of the at least one ethylenically unsaturated monomer M contains ≥0.01% and ≤60% by weight of at least one monomer M which has at least two nonconjugated ethylenically unsaturated double bonds.

9. The process according to claim 1, wherein the at least one ethylenically unsaturated monomer M is added in bulk under polymerization conditions.

10. The process according to claim 1, wherein the aqueous polymerization medium has a pH in the range ≥2 and ≤10.

11. An aqueous polymer dispersion obtainable by a process according to claim 1.

12. A polymer powder obtainable by drying an aqueous polymer dispersion according to claim 11.

13. The process according to claim 1, wherein the at least one dispersing assistant is present in an amount of ≤0.5% by weight.

14. The process according to claim 1, wherein the at least one dispersing assistant is present in an amount of ≤0.1% by weight.

15. The process according to claim 1, wherein the at least one dispersing assistant is not present.

16. The process according to claim 1, wherein the number-average particle diameter is from 10 to 70 nm.

17. The process according to claim 1, wherein a ratio of weight-average particle diameter to number-average particle diameter is ≤2.0.

18. The process according to claim 1, wherein the at least one ethylenically unsaturated monomer M comprises at least one ethylenically unsaturated monomer which at 20° C. and 1 atm (absolute) has a solubility <100 g per 1000 g of deionized water and selected from the group consisting of methyl acrylate, ethyl acrylate, n-butyl acrylate, tert-butyl acrylate, 2-ethylhexyl acrylate, 2-propylheptyl acrylate, methyl methacrylate, ethyl methacrylate, n-butyl methacrylate, tert-butyl methacrylate, 2-ethylhexyl methacrylate, 2-propylheptyl methacrylate, styrene, vinyltoluene, 2-methylstyrene, 4-methylstyrene, 2-n-butylstyrene, 4-n-butylstyrene, 4-n-decylstyrene, vinyl acetate, vinyl propionate, acrylonitrile, and methacrylonitrile, as the only ethylenically unsaturated monomer(s) having said solubility in said polymer particles, and optionally at least one additional ethylenically unsaturated monomer.

\* \* \* \* \*